United States Patent [19]

Curtis, Jr. et al.

[11] Patent Number: 4,765,861

[45] Date of Patent: Aug. 23, 1988

[54] APPARATUS AND METHOD FOR WINDING A TOROIDAL MAGNETIC CORE ONTO A BOBBIN FOR A TOROIDAL TRANSFORMER

[75] Inventors: Joe E. Curtis, Jr., Lexington; Richard W. Martin, Versailles, both of Ky.; Clair E. Piatt, Bronson, Mich.; Hubert L. R. Mohney, Bronson, Mich.; J. Richard McClelland, Bronson, Mich.; John L. Fisher, Lexington, Ky.

[73] Assignee: Kuhlman Corporation, Troy, Mich.

[21] Appl. No.: 698,982

[22] Filed: Feb. 6, 1985

[51] Int. Cl.[4] ...................... H01F 41/08; H02K 15/08

[52] U.S. Cl. .................................. 156/457; 156/73.1; 156/187; 156/292; 242/1.1 R; 242/7.04; 242/7.15; 242/77; 242/77.1; 242/118.4

[58] Field of Search .................... 156/73.1, 292, 304.2, 156/172, 169, 457, 187; 242/77, 77.1, 115, 118, 118.4, 118.41, 118.7, 1.1 R, 7.03, 7.04, 7.15

[56] References Cited

U.S. PATENT DOCUMENTS

| | | | |
|---|---|---|---|
| 445,598 | 2/1891 | McCahey | 242/118.4 |
| 2,775,418 | 12/1956 | Cadman | 242/118.7 |
| 3,002,610 | 10/1961 | Granger | 242/118.7 |
| 3,893,636 | 7/1975 | Wise et al. | 242/68.1 |
| 3,940,085 | 2/1976 | Campbell | 242/118.4 |
| 3,958,776 | 5/1976 | Torzo | 242/118.7 |
| 4,387,863 | 6/1983 | Edmonston | 242/118.7 |
| 4,406,422 | 9/1983 | Philips | 242/118.7 |
| 4,569,491 | 2/1986 | Kauffman | 242/118.41 |

*Primary Examiner*—Michael Wityshyn
*Attorney, Agent, or Firm*—Townsend and Townsend

[57] ABSTRACT

A toroidal electrical transformer having a low voltage coil, a high voltage coil, and an annular magnetic core is disclosed. The preferred low voltage and high voltage coils are each fabricated in two semitoroidal sections which together form an arcuate elongated passage therethrough. Two bobbin halves are inserted into the semitoroidal sections of the low and high voltage coils and are joined to form a cylindrical bobbin within the arcuate elongated passage. The preferred annular magnetic core is wound onto the bobbin within the arcuate elongated passage substantially from a continuous strip of magnetic material resulting in a toroidal transformer with continuous windings and a continuous wound core. Various components and sub-assemblies are also disclosed along with various apparatus and methods for producing such toroidal electrical transformers, its components and its sub-assemblies.

13 Claims, 9 Drawing Sheets

APPARATUS AND METHOD FOR WINDING A TOROIDAL MAGNETIC CORE ONTO A BOBBIN FOR A TOROIDAL TRANSFORMER

BACKGROUND OF THE INVENTION

The present invention constitutes both improvements to and additional inventions over the inventions disclosed in my co-pending application Ser. No. 337,356, filed Jan. 6, 1982, entitled "Toroidal Electrical Transformer and Method for Making Same", now abandoned, and the further co-pending applications, Ser. No. 662,312, filed Oct. 17, 1984, entitled "Apparatus and Method for Fabricating a Low Voltage Winding for a Toroidal Transformer," now U.S. Pat. No. 4,665,952 Ser. No. 662,467, filed Oct. 17, 1984, entitled "Apparatus and Method for Fabricating a High Voltage Winding for a Toroidal Transformer,"now abandoned, and Ser. No. 662,330, filed Oct. 17, 1984, entitled "Apparatus and Method for Winding a Magnetic Core for a Toroidal Transformer", now abandoned. The entirety of the disclosures of said co-pending applications are incorporated herein by reference thereto.

SUMMARY OF THE INVENTION

In general, this Application and the aforementioned co-pending Applications are directed to new toroidal transformer designs and construction apparatus and methods which improve the efficiency of electrical transformers. While the present invention provides similar improvements in efficiency as described in the foregoing co-pending applications, it differs from the inventions of the co-pending applications in a number of significant respects.

The present invention provides a method and apparatus for winding a strip of core material into a coil on a bobbin within an arcuate passage by inserting into the arcuate passage and joining two halves of the bobbin, and then rotating the joined bobbin to wind the strip into a coil. The present invention additionally provides a method and apparatus for winding core material into an arcuate passage through pre-formed windings by installing a bobbin within the arcuate passage by joining two bobbin halves, by rotating the bobbin within the arcuate passage to wind up the core material into a coil on the bobbin, and by applying a frictional drag force about the periphery of the core as it is being wound.

The features and advantages of the products, methods and machines described in the specification are not all-inclusive, many additional features and advantages being apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF THE SPECIFIC EMBODIMENTS

FIGS. 1 through 14 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
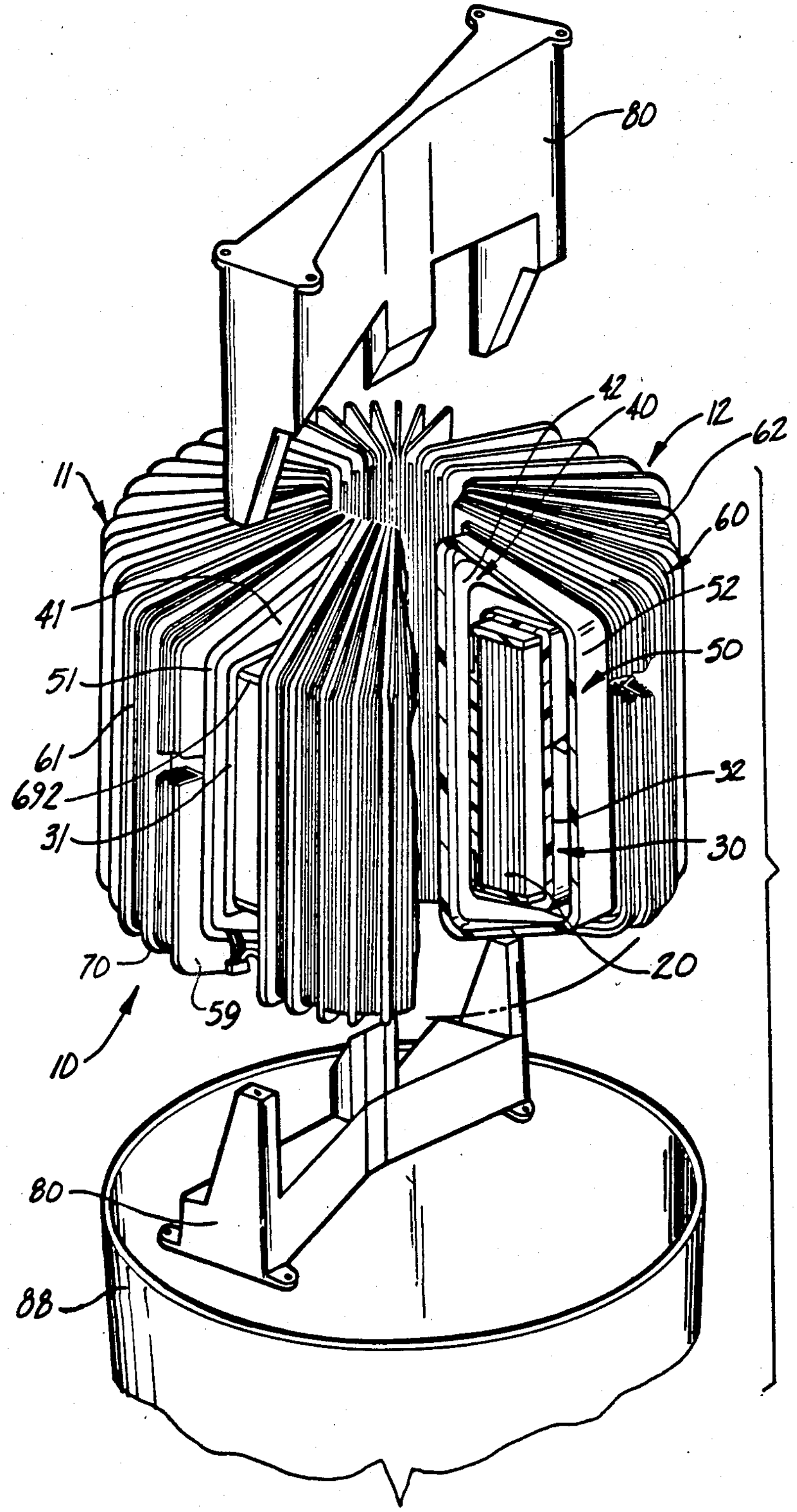
FIG. 1 is a partially cut-away, partially exploded, perspective view of a preferred toroidal electrical transformer according to the present invention.

FIG. 1 illustrates a preferred toroidal electrical transformer 10 including a continuously wound, toroidal or annular core 20 disposed within a core insulation tube 30. A low voltage coil or winding 40 surrounds the core insulation tube 30 and is encased by a high/low insulation barrier 50, which is in turn surrounded by a high voltage coil or winding 60.

The high voltage winding 60 is preferably made up of two substantially semitoroidal sections 61 and 62, each including a plurality of pie or wedge shaped bundles or coils continuously wound from a common wire and connected by loops of said common wire, e.g., twenty 8.25 degree coils forming in total an arc of about 165 degrees in each of said semitoroidal sections. At least the coils of the high voltage winding 60 near the ends of the sections 61 and 62 are preferably separated by insulating inserts or collars 70, around which said loops extend, for purposes of resisting impulse stresses resulting from any non-linear voltage distribution to which the high voltage winding may be subjected, such as those encountered during high voltage impulses caused, for example, by lightning. Such inserts 70 may in some cases be required between all high voltage winding segments as shown in the drawings, or more than one insert may be required between each segment. The inserts 70 include a radial flange separating the adjacent coils of the high voltage winding 60 and are preferably composed of a moldable paper board, Kraft paper or a synthetic insulator material, such as "MYLAR" or "KAPTON".

Similarly, the preferred low voltage winding 40 is also made up of two substantially semitoroidal sections 41 and 42, corresponding to the high voltage winding sections 61 and 62. Such preferred low voltage coil sections 41 and 42 may each include either a singular winding conductor, bifilar or multifilar parallel conductors in an interleaved configuration, one of such parallel conductors for each voltage winding. In the preferred embodiment, as shown in the drawings, the high voltage winding sections 61 and 62 and the low voltage winding sections 41 and 42 each extend circumferentially through an arc of approximately 165 degrees on each side of the transformer 10. Correspondingly, the core insulation tube 30 is preferably formed in two semitoroidal sections 31 and 32, and the high/low insulation barrier 50 is also preferably formed in two semitoroidal sections 51 and 52, with each of the sections extending circumferentially through an arc of approximately 165 degrees on each of the two semitoroidal sections 11 and 12 of the preferred transformer 10. Thus, the low voltage coil 40 is preferably disposed within the high voltage coil 60, and the low and high voltage coils 40 and 60 preferably encompass approximately 330 degrees of the circumferential length of the toroidal or annular core 20.

The term "continuous," as used with reference to the magnetic core 20, includes such core structures wound from a single or multifilar group of ribbon-like strips of continuous core material as well as, alternatively, a successive, serially-connected group of core material strips, wound-in successively to form increasingly large diametric regions of the core 20. Accordingly, while in the preferred embodiment a single strip of core material forms the wound core, the term "continuous" also contemplates plural strips of core material which are wound through a substantial number of turns greater than two to provide a wound core.

The terms "toroidal" or "annular" as used herein in connection with the high and low voltage coils 60 and 40, respectively, and in connection with the magnetic core 20, refer to the configuration of a torus generated by the revolutions of any of a number of regular or irregular shapes about an external axis.

The particular cross-sectional shapes of the generally toroidal or annular shaped core insulation tube 30 and high/low insulation barrier 50 correspond to the desired cross-sectional shapes of the toroidal or annular magnetic core 20 and high and low voltage coils 60 and 40, respectively.

Figure 2:
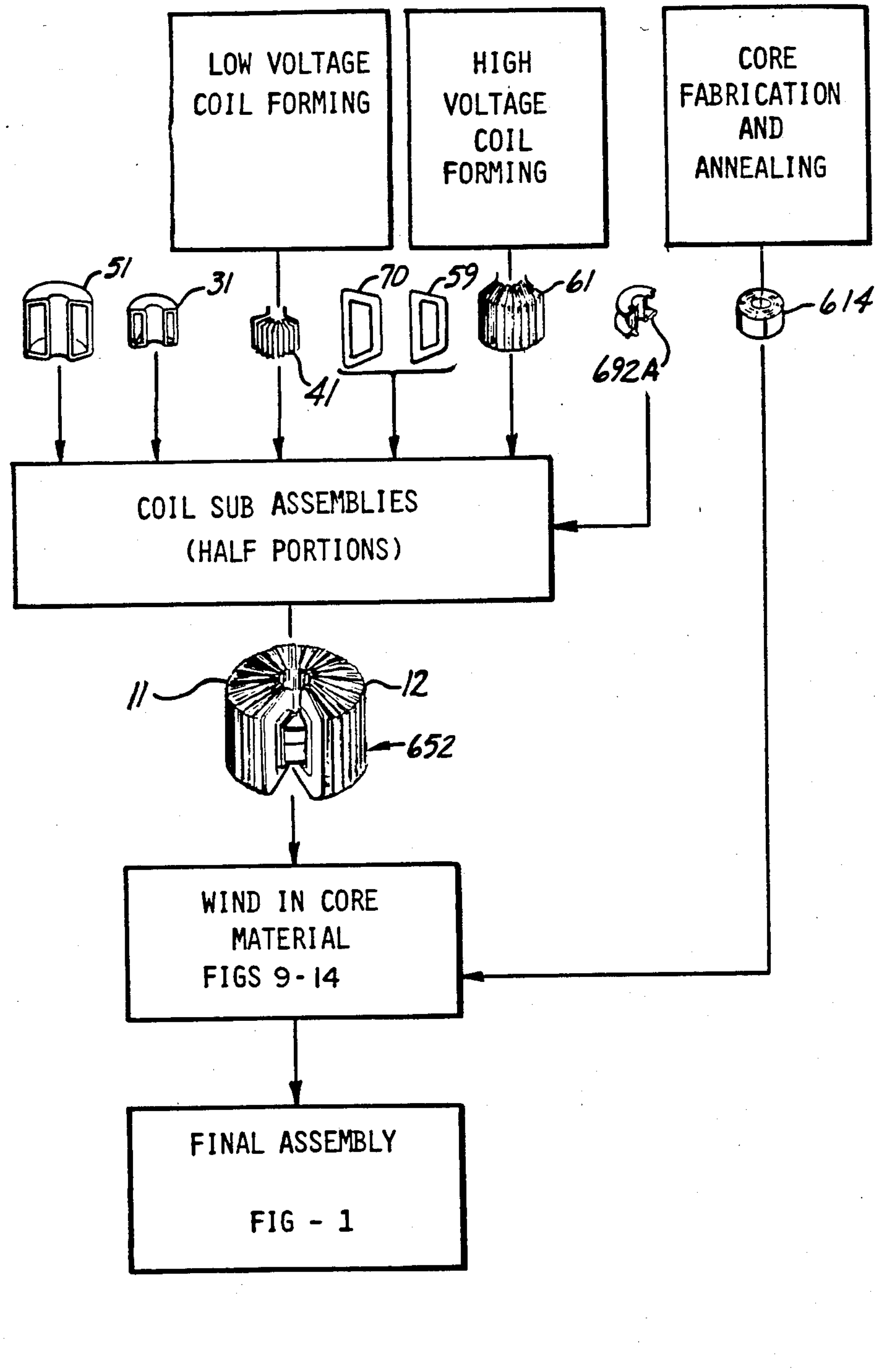
FIG. 2 is a block diagram generally illustrating the preferred method of manufacturing a toroidal electrical transformer according to the present invention.

FIG. 2 illustrates, in block diagram form, an overview of the major operations involved in the preferred method of manufacturing the toroidal electrical transformer 10. Although for purposes of illustration, the reference numerals in FIG. 2 and in the following discussion relate to the transformed semitoroidal section 11, the structure and production methods of the transformer semitoroidal section 12 are preferably identical to those of the transformer semitoroidal section 11.

The low voltage coil section 41 is preferably wound from bifilar conductor stock with each turn being formed into a pie or wedge shape (as viewed from above or below) to provide the toroidal or annular configuration. The low voltage coil 41 is then positioned onto the exterior of the core insulation barrier 31 and encased within the high/low insulation barrier section 51. The subassembly is then ready for addition of the high voltage coil section 61.

The insulating inserts 70 are located between adjacent bundles or coils of the high voltage coil section 61. The high voltage coil section 61 and the inserts 70 are then positioned onto the exterior of the high/low insulation barrier section 51 and end cuffs 59 are installed on the ends of the barrier section 51 to complete the operation of forming the semitoroidal section 11. Thereafter, one bobbin half 692A is installed in the arcuate elongated passage within the core insulation barrier 31. The semitoroidal section 12 is fabricated in a similar fashion. Once the two semitoroidal sections 11 and 12 are completed, they are positioned side by side and the two bobbin halves are joined to form a cylindrical bobbin within the arcuate elongated passage of the partial transformer assembly 652.

The core material, which is of a relatively thin, ribbon-like or strip configuration 602 is preferably prewound into a tight coil and automatically severed at a prescribed length determined by the size of the transformer being produced. The coil is then preferably restrained and annealed to relieve its internal stresses. The resultant structure is a pre-wound, toroidal coil 614 (FIG. 9) which is ready for winding into the above described partial transformer assembly 652 to form the magnetic core 20 of the toroidal transformer 10.

The remaining steps in the production process include the winding of the pre-formed, pre-annealed coil 614 onto the bobbin 692 within the arcuate elongated passage through a circumferentially extending gap between the semitoroidal sections 11 and 12 to form the magnetic core 20 (FIGS. 9 through 14), and the finishing assembly steps of installing support blocks 80 (FIG. 1), electrically connecting the respective sections of low voltage coil 40 and the high voltage coil 60, and mounting the assembly in a suitable housing structure 88 (see FIG. 1).

Figure 3:
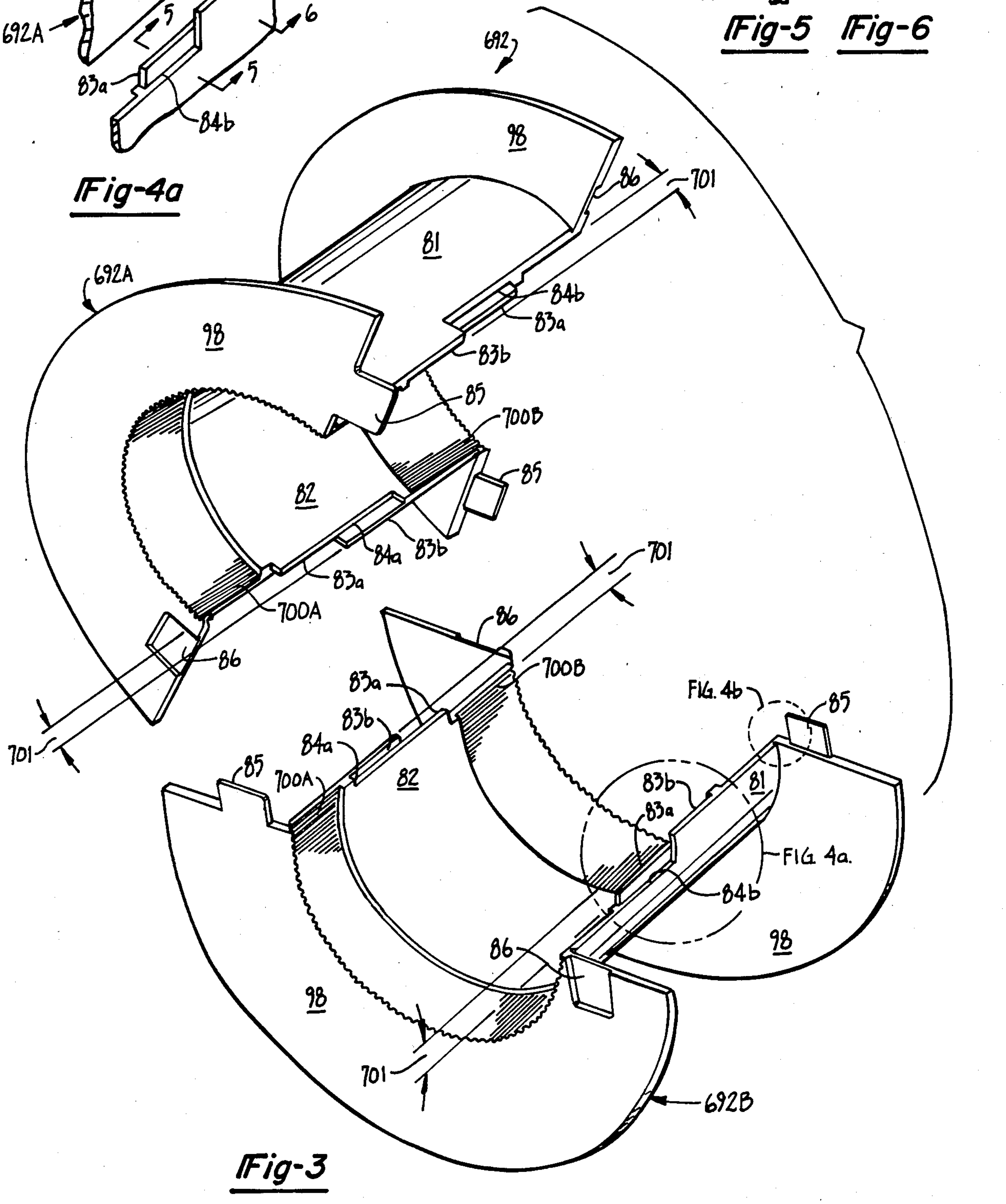
FIG. 3 is an exploded perspective view of a core wind-in bobbin of the present invention.

In FIG. 3, a detailed view of the bobbin 692 is provided. The bobbin 692 is utilized in the fashion described in connection with FIGS. 9 through 14 to facilitate the installation of the magnetic core 20 of the toroidal transformer. The bobbin 692 generally comprises a central cylindrical hollow hub 81 which joins two radial flanges 98. The bobbin 692 is adapted so that the strip of core material can be wound upon the hub 81 and also be constrained between the radial flanges 98. In other words, the area external to the hub 81 and between the radial flanges 98 provides a winding portion of the bobbin 692 into which the strip of core material 602 is wound. At the circumferential intersection of the hub 81 and the radial flanges 98, an undercut radius 96 projects radially inward into the hub 81, as shown in FIG. **4*b*. The undercut radius 96 serves as a stress relief to strengthen the attachment of the radial flanges 98 to the hub 81 without unduly increasing the material thickness of the bobbin flanges 98 or bobbin hub 81, which would reduce the efficiency of fill of the magnetic core material within the elongated arcuate passage of the transformer semitoroidal sections 11 and 12, and, unlike a fillet, allows the strip or strips of core material comprising the core build 698 to lay flat across the full width of the hub 81**.

The interior of the hollow hub 81 has a pair of axially-spaced, circumferentially-extending gear drive surfaces 700A and 700B provided with axially disposed interior gear teeth used for rotatably driving the bobbin 692. A bearing surface 82 is located between the gear drive surfaces 700A and 700B and projects radially inward beyond the gear teeth of gear drive surfaces 700A and 700B. When installed, the bearing surface 82 will contact the coil insulation material 30 prior to any contact by the gear teeth to prevent that material from being abraded or otherwise damaged by the gear teeth 700A and 700B during rotation of the bobbin 692.

Figure 4A:
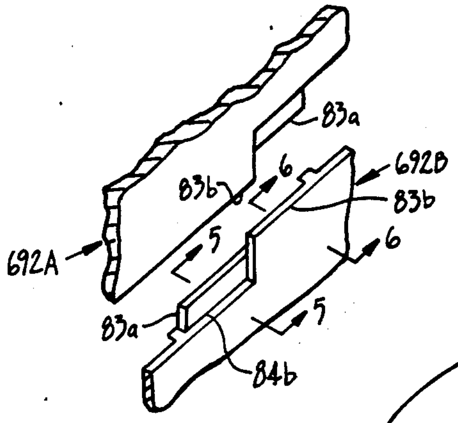
FIG. 4*a* is a perspective detail view of an assembly joint of the bobbin of FIG. 3.
Figure 4B:
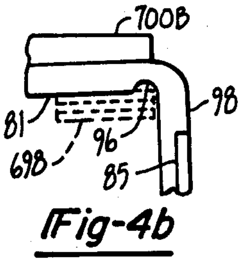
FIG. 4*b* is a top detail view of the joint between a hub and a radial flange of the bobbin of FIG. 3.
Figure 5:
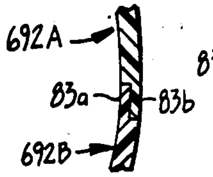
FIG. 5 is a sectional detail view of the bobbin of FIG. 3 and is taken along line 5—5 of FIG. 4*a*.
Figure 6:
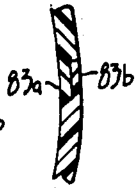
FIG. 6 is a sectional detail view of the bobbin of FIG. 3 and is taken along line 6—6 of FIG. 4*a*.

The bobbin 692 consists of a pair of identical halves or subparts 692A and 692B which are adapted to mate to form the complete bobbin 692 after assembly of each of the bobbin halves into respective semitoroidal sections 11 and 12 of the transformer. The bobbin halves 692A and 692B are especially configured to permit efficient operation of the assembled bobbin 692. Particularly, the bobbin halves 692A and 692B are provided with joining means including an axial lock at each joint of the bobbin half 692A and 692B. Each axial lock includes flanges **83*a* and 83*b* which are adapted to interlock with inset shoulders 84*a* and 84*b* as shown in FIGS. 4*a*, 5, and 6, upon mating of the bobbin halves 692A and 692B to prevent axial shifting of the bobbin halves. Each bobbin half 692A and 692B is provided with additional joining means including a pair of projecting tabs 85 and complementary recesses 86 which are designed to mate with corresponding recesses 86 and tabs 85 of the other bobbin half, with the tabs 85 wholly residing within their mated recesses 86. Preferably, the tabs 85 are adhesively or ultrasonically bonded or otherwise adhered to their mated recesses 86 to retain the bobbin halves 692A and 692B** in their interlocked state.

Figure 7:
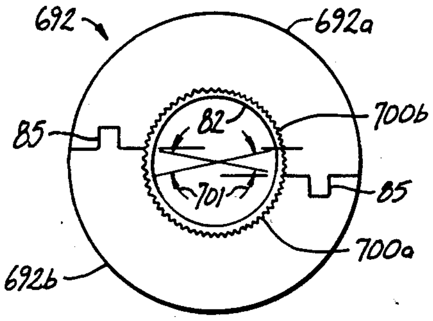
FIG. 7 is a side elevation view of the bobbin of FIG. 3.

It should be noted that the gear surfaces 700A and 700B terminate at different circumferential positions. Consequently, when the bobbin 692 is driven by the pinion drive shaft 656 (see FIGS. 9 through 14), the pinion drive shaft gears transfer between the bobbin halves one pinion gear at a time to reduce the drive forces tending to separate the bobbin halves 692A and 692B. As shown in FIGS. 3 and 7, there are transition regions 701 spanning the joints of the bobbin 692 wherein the pinion shaft drive gears engage one set of gear teeth of bobbin half 692A and the other set of gear teeth of bobbin half 692B. In other words, the two pinion gears driving the bobbin 692 do not simultaneously transfer between the gear teeth of one bobbin half to the gear teeth of the other bobbin half, but transfer in staggered fashion so that the rotational drive forces will not unduly stress the bonded joints between the tabs 85 and recesses 86. Although the bobbin 692 is shown as being driven in rotation by the pinion drive shaft 656 engaging the gear surfaces 700A and 700B disposed on the inner surface of the hollow cylindrical hub 81, other drive mechanisms could be utilized, such as, for example, a drive mechanism which frictionally engages the outer circumference of the radial flanges 98 to rotate the bobbin 692.

As previously explained, the bobbin halves 692A and 692B are assembled with the pre-formed high and low voltage winding assemblies 40 and 60, the insulating tubes 30 and 50, and the inserts 70 and cuffs 59 to form the transformer semitoroidal sections 11 and 12. The bobbin halves 692A and 692B are then Joined to construct a complete bobbin 692 within the pre-formed windings and insulation whereby the core can thereafter be wound into the pre-formed windings onto the bobbin 692.

Figure 8:
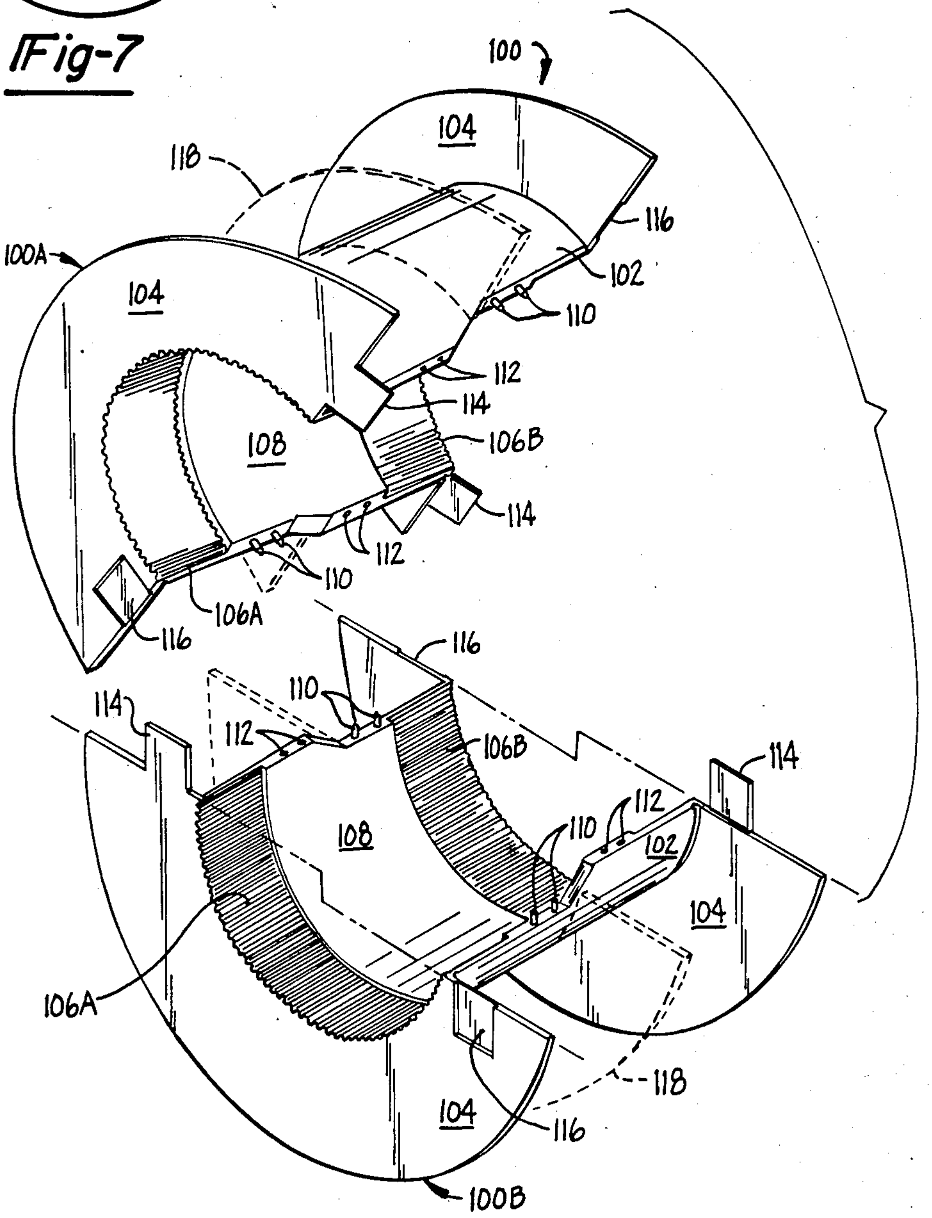
FIG. 8 is an exploded perspective view of an alternative core wind-in bobbin.

An alternative embodiment of a core wind-in bobbin 100 is illustrated in FIG. 8. The bobbin 100 is similar to and is utilized in the same fashion as the bobbin 692 previously described for winding the magnetic core 20 into the partial transformer assembly 652. The bobbin 100 generally comprises a central cylindrical hollow hub 102 which joins two radial flanges 104. The bobbin 100 is adapted so that the strip of core material can be wound upon the hub 102 and constrained between the radial flanges 104. The interior of the hollow hub 102 has a pair of axially-spaced circumferentially-extending gear drive surfaces 106A and 106B provided with axially disposed interior gear teeth used for rotatably driving the bobbin 100. A bearing surface 108 is located between the gear drive surfaces 106A and 106B and projects radially inward beyond the gear teeth of gear drive surfaces 106A and 106B. When installed, the bearing surface 108 will contact the coil insulation material 30 prior to any contact by the gear teeth to prevent that material from being abraded or otherwise damaged by the gear teeth during rotation of the bobbin 100.

The bobbin 100 consists of a pair of identical halves 100A and 100B which are adapted to mate to form the complete bobbin 100 after assembly of each of the bobbin halves into respective semitoroidal sections 11 and 12 of the transformer. The bobbin halves 100A and 100B are especially configured to permit efficient operation of the assembled bobbin 100. Particularly, the bobbin halves 100A and 100B are provided with an axial lock at each joint of the bobbin half 100A and 100B. Each axial lock includes dowel pins 110 extending tangentially from the hub portion of each bobbin half and which are are adapted to interlock with corresponding holes 112 provided in the other bobbin half upon mating of the bobbin halves 100A and 100B to prevent axial shifting of the bobbin halves. Each bobbin half is provided with a pair of projecting tabs 114 and complementary recesses 116 which are designed to mate with corresponding recesses 116 and tabs 114 of the other bobbin half, with the tabs 114 wholly residing within their mated recesses 116. Preferably, the tabs 114 are adhesively or ultrasonically bonded or otherwise adhered to their mated recesses 116 to retain the bobbin halves 100A and 100B in their interlocked state.

As do the gear surfaces 700A and 700B of bobbin 692, the gear surfaces 106A and 106B of bobbin 100 terminate at different circumferential positions so that the pinion shaft drive gears translate between the bobbin halves one pinion gear at a time to reduce the drive forces tending to separate the bobbin halves 100A and 100B. Note that the undercut radius described above in relation to FIG. **4*b* and the bobbin 692 is also utilized on the alternative bobbin 100**.

FIG. 8 also illustrates an optional interior flange 118 for inclusion with either bobbin 100 or bobbin 692. The interior flange 118 extends radially outward from the center of the cylindrical hub 102 to substantially the same radial extent as the side flanges 104. The interior flange 118 on the bobbin 110 permits the utilization of core material having a width narrower than the full width of the bobbin, while creating an effective magnetic core nearly equal to the full width of the bobbin. When the interior flange 118 is utilized, two strips of core material may be simultaneously or sequentially wound onto the bobbin 100 to form two coaxial coils, with each coil positioned between the interior flange 118 and a side flange 104. Alternatively, more than one interior flange may be disposed between the side flanges to allow the winding of multiple coils, with each coil positioned between two adjacent flanges, and with the multiple coaxial coils of core material forming the magnetic core of the toroidal transformer 10.

Core Wind-In Machine

Figures 9, 10:
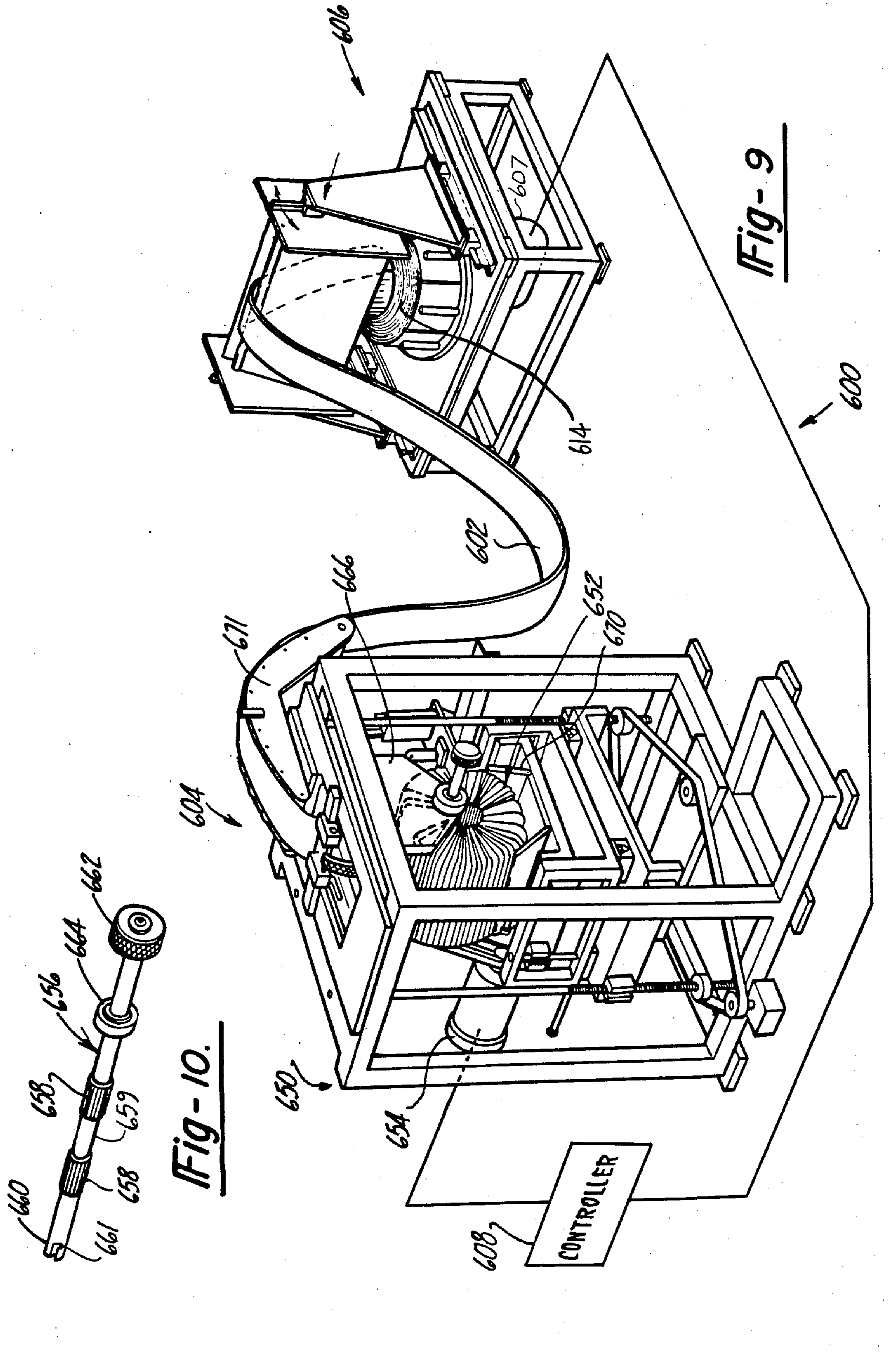
FIG. 9 is a view of a preferred core wind-in machine used in connection with the present invention.
FIG. 10 is a perspective view of a pinion shaft used to rotate the bobbin in winding core material into the toroidal electrical transformer.

In FIG. 9, an overall view is provided of the machine 600 used to wind the core material 602 into the completed low voltage and high voltage windings. The core wind-in machine 600 has two major subassemblies, a core insertion machine 604 and a coil dereeling machine 606. The two subassemblies are controlled by a suitable servo controller 608. In brief, the coil dereeling machine 606 supplies one or more continuous strips of core material 602 from a pre-wound and annealed coil 614 to the core insertion machine 604 for rewinding into one or more coils on the bobbin 692 to form a magnetic core 20 of the toroidal transformer 10.

As shown in FIG. 9, the core insertion machine 604 includes a frame 650 which supports the partial transformer assembly 652 consisting of the high voltage winding 60, the low voltage winding 40, and the various insulating barriers 30 and 50 between the windings themselves and between the windings and the arcuate core passage. Additionally, the partial assembly 652 includes a bobbin 692 installed within the arcuate core passage and having a hollow hub with internal gear teeth.

A servo-controlled motor 654 of the core insertion machine 604 is controlled by the servo controller 608 so as to be driven in synchronism with the servo-controlled motor 607 of the coil dereeling machine 606 so that the speed of the strip of core material 602 being wound into the winding assembly 652 matches the speed of the strip of core material 602 being unwound from the annealed coil 614 in the coil dereeling machine 606. The motor 654 is connected via a toothed belt drive to a toothed pulley 740 (shown in FIG. 14) which engages a pinion shaft 656, shown in FIG. 10. The pinion shaft 656 has two pinion gear portions 658 separated by an undercut portion 659, a socket engaging portion 660 including a J sot 661 as shown, a handle 662 and a bearing 664. The J slot 661 of the socket engaging portion 660 couples to a coupling pin (not shown) in the toothed pulley 740 so that the motor 654 rotatably drives the pinin shaft 656. In turn, the pinion gears 658 engage the internal gear teeth 700A and 700B of the bobbin 692 to rotate the bobbin 692. The pinion shaft 656 is supported by a pair of bearing support plates 666 (only one being shown in FIG. 9) disposed on opposite sides of tne partial transformer assembly 652.

The partial transformer assembly 652 is supported within the core insertion machine 604 by a movable cradle 670 having oblique sides for engaging and thereby positioning the partial transformer assembly 652 as shown. The cradle 670 is raised and lowered by a suitable lift mechanism to correspondingly raise and lower the partial transformer assembly 652, as described in detail in connection with FIGS. 13 and 14.

As shown in FIG. 9, the strip of core material 602 is received from the cool dereeling machine 606 and is guided for winding onto the bobbin within the partial transformer assembly 652 by a suitable free-rolling conveyor 671. The conveyor 671 is configured to provide a gradual curved transition for the strip of core material 602 leading into the arcuate passage within the core insulation tube 30 and may be adjustable for that purpose to suit various transformer core and coil designs of different dimensions. Although the strip of core material 602 is shown to be a single strip, the core material 602 could alternatively be two or more strips positioned side-by-side or stacked on top of one another.

Figure 11:
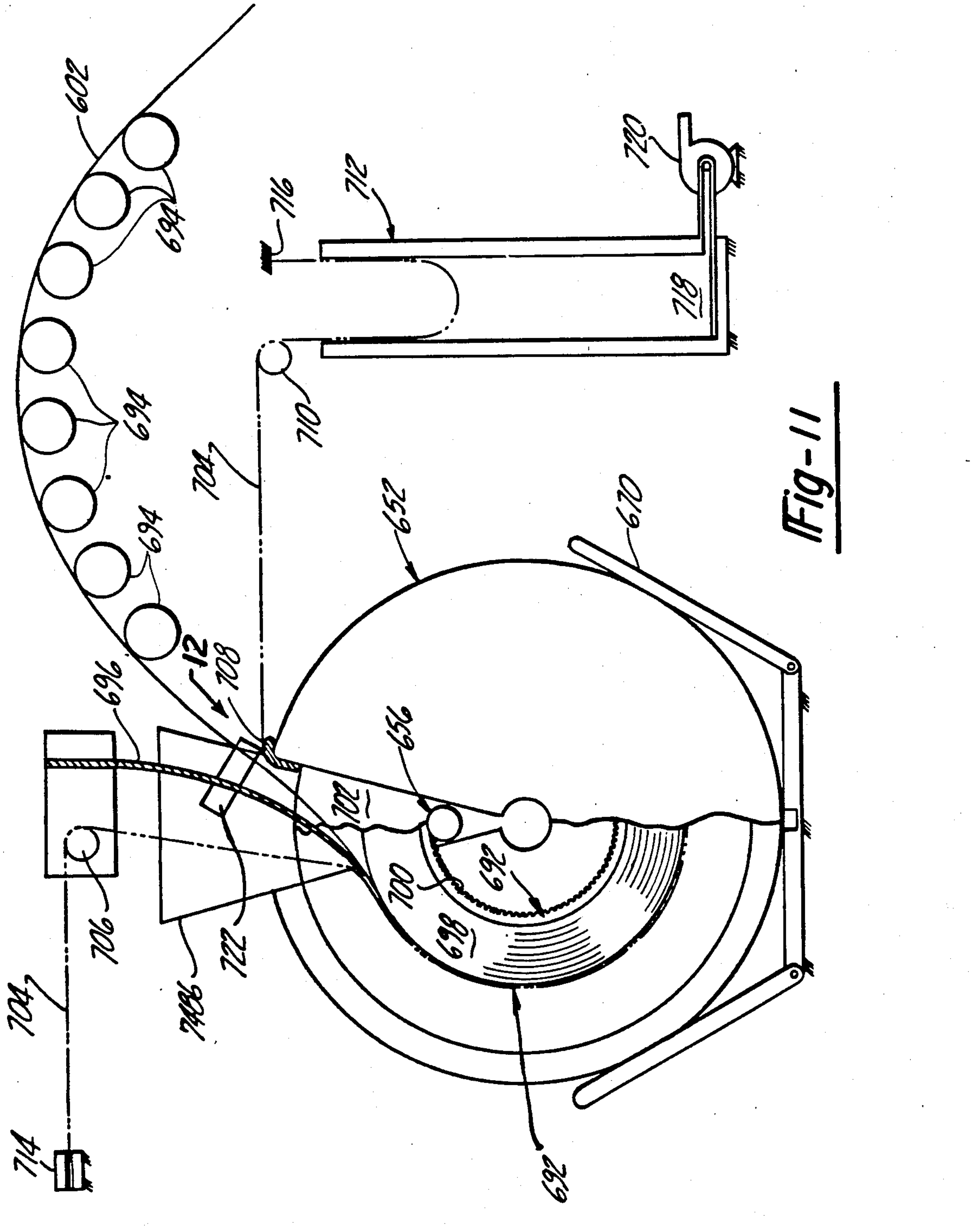
FIG. 11 is a schematic view partially in section of a core insertion subassembly of the core wind-in machine of FIG. 9.

The path of the core material as it enters the core wind-in subassembly 604 is best seen in FIG. 11. In FIG. 11, the elements which control the strip of core material 602 as it winds into a coil on the bobbin 692 are illustrated. Rollers 694 of the freerolling conveyor 671 are seen supporting the core material 602 after having been dereeled from the dereeling machine 606. The strip of core material 602 passes beneath hold-down tines 696 which are fabricated of spring material and which bear radially inward upon the core material 602 to prevent lifting thereof during the core winding operation. Such lifting could occur, for example, if the strip of core material 602 catches on the side flanges 98 of bobbin 692 during wind-on. Note that as bobbin 92 is rotated, a core build 698 of core material 602 in the shape of a coil is effected within the arcuate elongated passage formed by the intericr of the core insulation tube 30. The winding of multiple cores or a single core with multiple layers or strips of core material is accomplished in the same manner.

As can be seen in the figure, the bobbin 692 includes a plurality of internal gear teeth 700 which are engaged by the pinion gears 658 of the pinion shaft 656. The bobbin 692 is disclosed in greater detail in FIGS. 3 through 8.

To assure a tightly wound core build, a drag belt 704 is used which extends about and frictionally engages most of the periphery of the core build 698. Particularly, the drag belt 704 extends over a first horizontal pulley 706 and downwardly into the bobbin 692. The drag belt 704 then passes counter-clockwise about the periphery of the core build 698 and past a removable horizontal guide lip 708. The drag belt 704 thereafter passes over a second horizontal pulley 710 and into a tension-producing vacuum box 712 which contains a loop of the drag belt 704. Preferably, the drag belt 704 is thin and flexible, and is composed of a low friction material such as woven nylon. The drag belt 704 is fixedly connected to clamps 714 and 716 at its respective ends such that the tension applied to the drag belt 704 is predominantly a function of the tension produced by the vacuum box 712. The vacuum box 712 fits snugly with the sides of the drag belt 704 to contain a partial vacuum in the bottom cavity 718 of the vacuum box 712 as supplied by a suitable blower 720 or other vacuum source. The vacuum in the bottom 718 cavity of the vacuum box 712 creates a differential pressure across the drag belt 704 which pulls the drag belt loop downwardly to apply tension to the drag belt 704 thereby causing the friction between the drag belt 704 and the core build 698 to be controlled thereby. Note that the drag belt 704 contacts a substantial portion of the periphery of the outside turn of the core build 698, for example, approximately 270 degrees or more. This substantial area of contact provides an even distribution of drag force to the core build 698.

Figure 12:
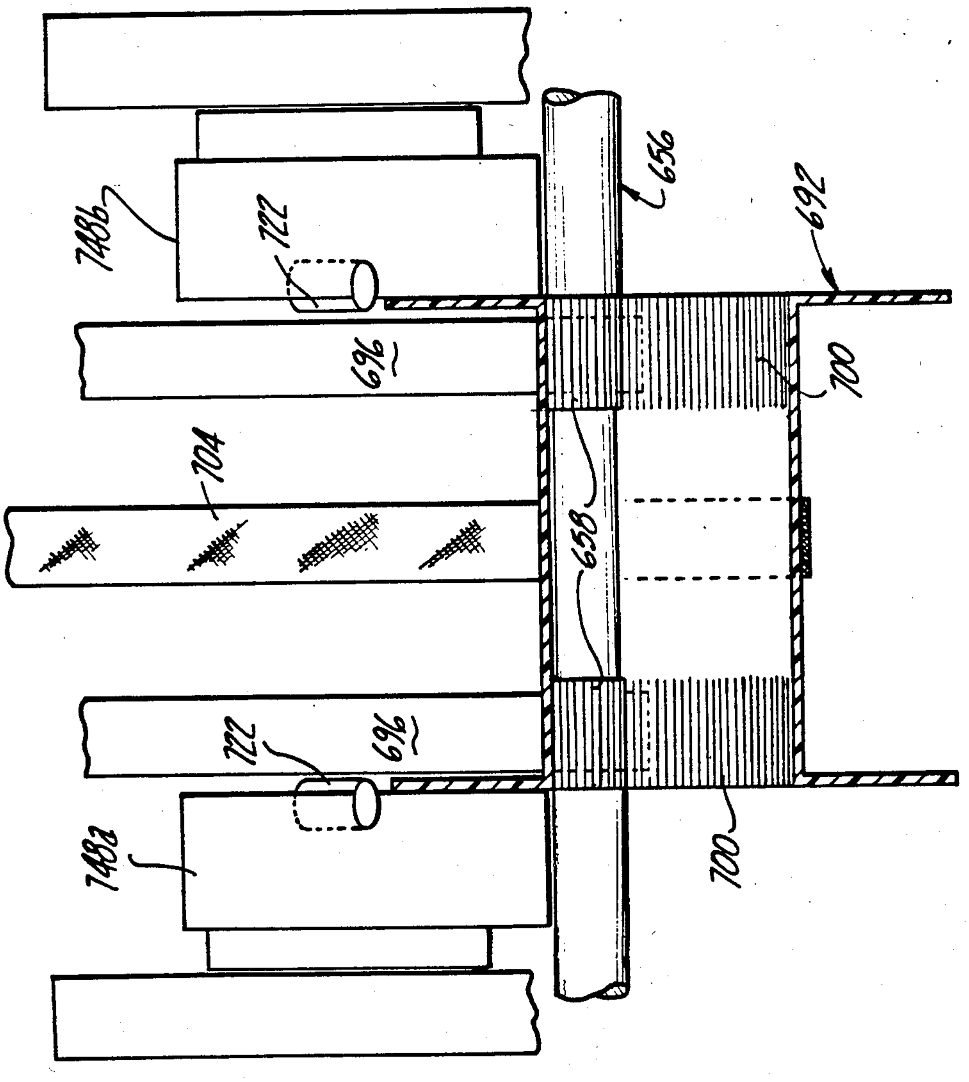
FIG. 12 is a sectional detail view of the core wind-in bobbin used in the core insertion subassembly of FIG. 11.

With reference now to FIG. 12, the relationship of the hold-down tines 696 and the drag belt 704 can be best seen. In FIG. 12, the bobbin 692 is shown prior to the winding of any of the core material 602. Looking from the direction of the arrow in FIG. 11, the hold-down tines 696 are seen to be positioned at the lateral extremities of the interior of the bobbin 692 to engage the lateral extremities of the core material 602. The drag belt 704 is positioned approximately midway between the hold-down tines 696. A cylindrical guide bushing 722 is positioned at each side of the bobbin 692 for guiding the core material 602 into the bobbin 692. The bushings 722 are preferably made of wear-resistant material such as carbide and are also preferably adjustably rotatable about their axes to present new wear surfaces to the core material 602 as necessary.

If a bobbin with a central third flange is utilized for separately or simultaneously winding two strips of core material coaxially onto the bobbin, additional or movable hold-down tines and drag belts are needed. For the simultaneous winding of two strips of core material, four hold-down tines and two drag belts may be used, with a hold-down tine positioned adjacent to each side flange, a hold-down tine positioned on each side of the center flange 118, and a drag belt positioned between the center flange and each side flange. Additionally, if more than two strips of core material are to be wound coaxially onto the bobbin, then additional hold-down tines and drag belts are required for simultaneous core wind-in. If multiple, coaxially oriented cores are to be wound separately then movable hold-down tines and a movable drag belt may be utilized by repositioning such movable hold-down tines and drag belt prior to each core winding operation.

Figure 13:
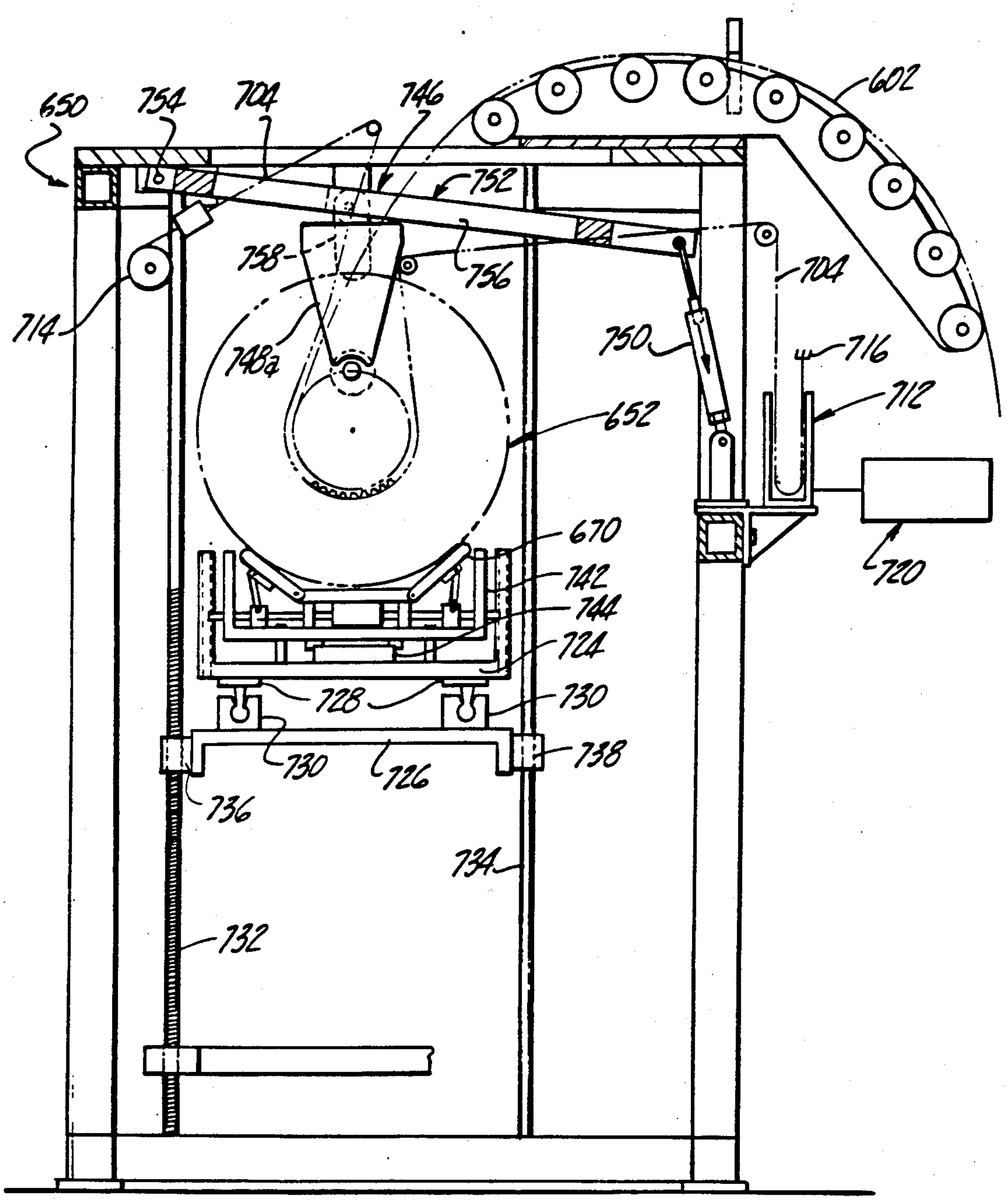
FIG. 13 is a side elevation view of the core insertion subassembly of FIG. 11.
Figure 14:
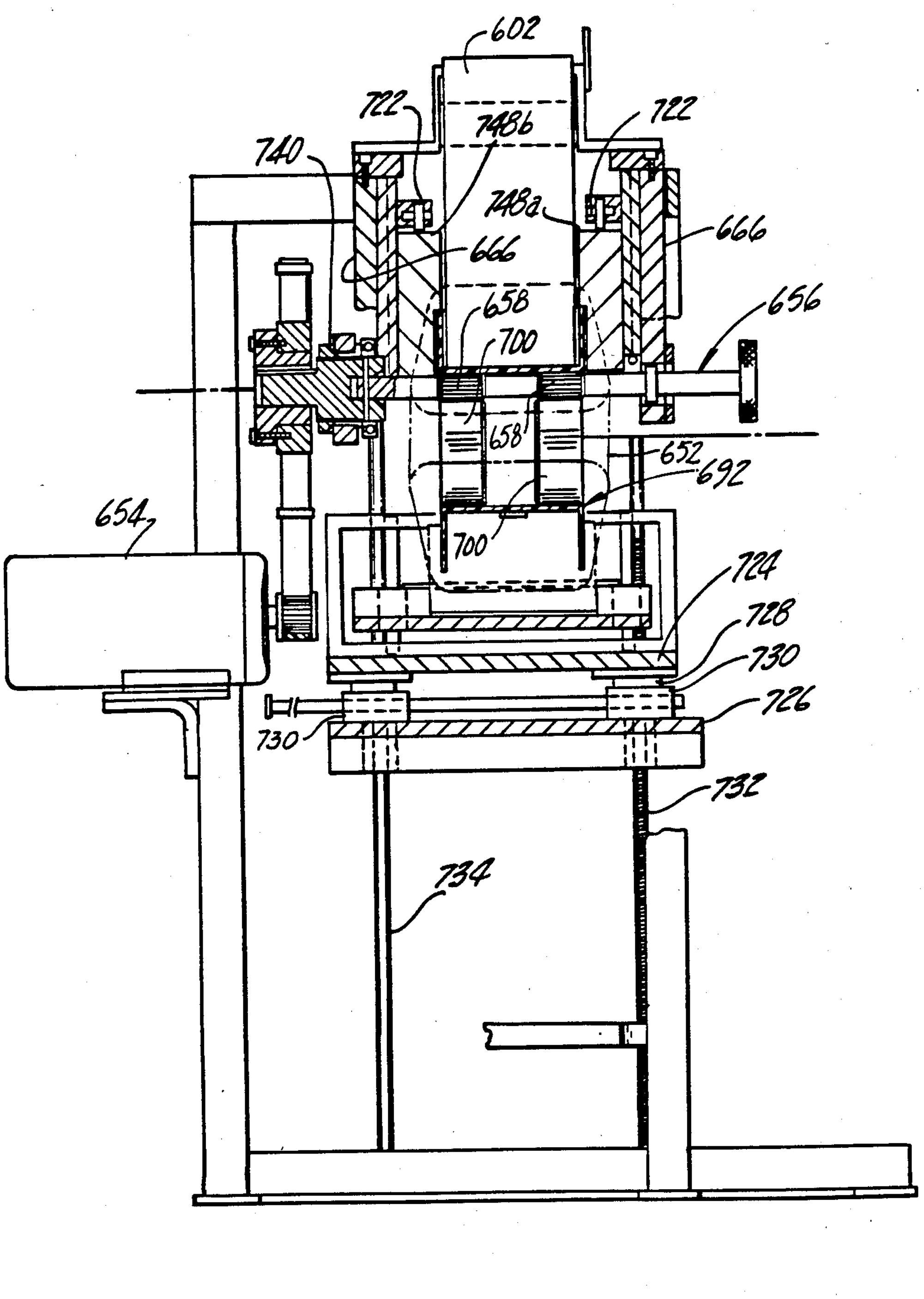
FIG. 14 is a front elevation view partially in section of the core insertion subassembly of FIG. 11.

In FIGS. 13 and 14, the apparatus for supporting and positioning the partial transformer assembly 652 is illustrated. The purpose of such position and supporting structure is to align the gear teeth of the bobbin 692 with the drive for the bobbin drive shaft 656 and to spread the respective halves of the winding subassemblies to provide a maximum opening for ingress and control of the core material 602 for winding on the bobbin 692 while maintaining the concentricity of the respective halves of the winding subassemblies. Such concentricity is desired since the unimpeded rotation of the bobbin requires an annular core cavity.

The cradle 670 is mounted on a horizontal slide platform 724 which in turn is mounted on an elevating platform 726 via a pair of parallel slide rails 728 and four guide bushings 730 which slidably receive the guide rails 728. By virtue of the slidable mounting of the platform 724, the cradle 670 can be slid frontwardly, i.e., outwardly of frame 650, to permit easy placement and removal of transformer assemblies 652 before and after the core wind-in operation. The elevating platform 726 is mounted on a pair of diagonally-disposed jack screws 732 (only one being shown) and a pair of diagonally disposed guide rods 734 (only one being shown) via jack nuts 736 and guide bushing 738, respectively. The jack screws 732 are driven in synchronism (by a drive not illustrated) to raise and lower the elevating platform 726, and consequently, to raise and lower the cradle 670 thereby positioning the partial transformer assembly 652 accurately relative to the toothed pulley 740 for the bobbin drive shaft 656.

Accurate positioning of the partial transformer assembly 652 relative to the toothed pulley 740 can be facilitated by an optional fine-adjust mechanism disposed between the horizontally-slidable platform 724 and the cradle 670. The fine-adjust mechanism 744 may consist of a slidable wedge for elevating an intermediate platform 742 on which the cradle 670 resides or may consist of a low-hydraulic piston and cylinder arrangement. The fine-adjust mechanism 744 would be used complementary to the jack screw 732 and jack nut 736 height adjusting mechanism to provide fine adjustments in the height of cradle 670 to accurately position the partial transformer assembly 652 with respect to the toothed pulley 740 to provide appropriate engagement between the teeth 700 of the bobbin 692 and the pinion gears 658 of the bobbin drive shaft 656. This alignment is illustrated in FIG. 14 in which the two sets of teeth 700 of the bobbin 692 are seen to be engaged with the two sets 658 of pinion teeth of the bobbin drive shaft 656.

Accurate positioning of the partial transformer assembly 652 is also accomplished by the cooperation of the cradle 670 and a wedge insertion mechanism 746 (as shown in FIG. 13) which is adapted to forcibly separate the halves of the transformer assembly to provide a maximum practical entry passage for wind-in of the core material 602. More particularly, the wedge mechanism 746 includes a pair of axially spaced wedge members 748*a* and 748*b* having converging side surfaces which define an included angle of about 30 degrees. The wedge members 748 are forcibly positioned between the halves of the partial transformer assembly 652. Such forcible positioning of the wedge members 748 causes the arcuate gap between the halves of the transformer assembly 652 at the lower portion thereof to be nearly closed leaving only sufficient gap at this lower point for the extended coil leads of low voltage winding 40, while opening the arcuate gap between such halves at the upper portion thereof to about 30 degrees. Such opening of the upper arcuate gap to approximately 30 degrees permits insertion of the bobbin drive shaft 656 into the hollow hub portion of the bobbin 692 to facilitate wind-in of the core material 602.

As can be seen in FIG. 14, the wedge members 748 are sufficiently axially-spaced to permit unimpeded ingress of the full width of the core material 602. Additionally, the support provided by the three points of engagement of the cradle 670 in cooperation with the locating effect of the wedge members 748 rigidly locates the partial transformer assembly 652 so that the arcuate passages through each of the halves of the partial transformer assembly 652 are aligned concentrically. The concentric alignment of the arcuate passages through the halves of the transformer assembly 652 is necessary to allow the annular bobbin 692 to freely rotate within the transformer assembly 652. If the arcuate passage walls within the transformer assembly 652 did not define substantially perfect circles, the bobbin 692 would tend to bind with and abrade the core insulation tube 30, thereby increasing substantially the bobbin drive force and risking stripping of the bobbin teeth.

It should be noted that the concentric alignment of the halves of the transformer assembly 652 is in addition to the requirement that the pinion gears 658 of the drive shaft 656 be accurately aligned with the gear teeth on surfaces 700 of the bobbin 692; such accurate alignment of the pinion gears and gear teeth is also facilitated by the wedge members 748 and the three point support provided by the cradle 670 (as shown in FIG. 13).

The wedge members 748 are forcibly driven by means of an air piston and cylinder 750 which is pivotedly connected to one end of a centrally-bifurcated actuating arm 752. The actuating arm 752 is pivotedly connected at its other end to a fulcrum 754 which is fixed relative to frame 650. The actuating arm is bifurcated at its central position to provide two axially spaced center arms 756. Each axially spaced center arm 756 is aligned with and applies a downward force to one wedge member 748*a* or 748*b* via a free wheeling bearing 758 which is pivotedly connected by a shaft to the respective center arm 756 but is not rigidly connected to the wedge member **748*a* or 748*b*. The wedges 748*a* and 748*b* are vertically aligned by and free to move up and down on a slider. Contraction of the piston and cylinder 750 causes forcible downward movement of the wedge member 748 to spread the upper arcuate gap of the partial transformer assembly 652** and causes the accurate alignments as described above.

After the transformer assembly 652 has been spread and aligned, the core material 602 can be wound onto the bobbin 692 by rotation of the drive shaft 656. The drive shaft 656 is rotated by the synchronous motor 654 through the drive belt and toothed pulley 740 as previously described. During wind-in of the core material 602, the drag belt 704 frictionally engages the outside of the core build 698 to maintain a tight build of core material 602 while limiting tension which might magnetically damage the core material. The spring tines 696 bear radially upon the core material 602 to counteract lift up of the core material 602 during occasional engagements between the side flanges 98 of the bobbin 692 and the edges of the core material 602. After the core is nearly completely wound, the drag belt 704 is preferably removed to eliminate its bulk and the last several turns of the core material 602 are wound onto bobbin 692 to substantially fill the available space between the hub 81 of the bobbin 692 and the outermost perimeter of the arcuate elongated passage within the core insulation tube 30. An alternative procedure which may be employed in finishing the wind-in of the core material 602 is that, after the core 20 is completely wound, the drag belt 704, which is thin and flexible, is removed by pulling while rotating the completed core 20, thus almost completely filling the available space between the bobbin 692 and the outermost perimeter of the arcuate elongated passage within the core insulation tube 30. Upon completion of core wind-in, the transformer assembly 652 is removed from the core winding machine 604 by lifting the cradle 670 sufficiently to provide clearance for disengaging the pinion shaft 656, and then lowering the cradle 670 to its lowest travel, and sliding the transformer assembly 652 (now including the core 20) on the lift platform 724 outwardly. Thereafter, the transformer assembly 652 (with the core 20 installed) is transferred to an adjacent table fixture (not shown) and the semitoroidal sections 11 and 12 are rotated to provide equal arcuate gaps of approximately 15 degrees between the two winding sections. Support blocks 60 (shown in FIG. 1) are then installed to fix the winding sections in position.

The foregoing discussion discloses and describes merely exemplary methods and embodiments of the present invention. One skilled in the art will readily recognize from such discussion that various changes, modifications and variations may be made therein without departing from the spirit and scope of the invention described in the following claims.

What is claimed is:

1. An apparatus for winding a strip of material into a coil comprising:

first and second bobbin halves joined together to form a bobbin, said bobbin having a first, outer surface for receiving the strip of material and a second, inner surface, the second surface having first and second sets of internally directed first gear teeth disposed circumferentially about said second surface and spaced apart by a bearing surface; and a gear drive including second gear teeth, the second gear teeth drivingly engaging the first gear teeth so to rotate said bottom to wind the strip of material into a coil on said first surface of said bobbin.

2. An appartus as recited in claim 1 further comprising: a tab extending from one of said bobbin halves and adapted for engaging an adjacent recess in the other of said bobbin halves for joining said bobbin halves together.

3. An apparatus as recited in claim 2 wherein said bobbin includes two side flanges extending radially outward from both lateral ends of a cylindrical hub, and wherein said tab extends from one flange of said one bobbin half and engages said recess in the adjacent flange of said other bobbin half.

4. An apparatus as recited in claim 2 wherein each bobbin half includes one or more tabs and recesses, and wherein said bobbin halves are identical in shape.

5. An apparatus as recited in claim 2 wherein said bobbin includes a cylindrical hub and wherein said tab extends from said cylindrical hub of said one bobbin half and engages said recess in the adjacent hub of said other bobbin half.

6. An apparatus as recited in claim 1 further comprising at least one dowel pin each extending tangentially from one of said bobbin halves and adapted for insertion into a corresponding mating hole in the other of said bobbin halves so to join the bobbin halves to one another.

7. An apparatus as recited in claim 1 further comprising means for axially and radially positioning said bobbin halves relative to one another and means for securing said bobbin halves together to form said bobbin.

8. An apparatus as recited in claim 1, wherein said first, outer surface of said bobbin defines a cylindrical hub with a constant diameter, and said bobbin includes two side flanges extending radially outward from both lateral ends of the cylindrical hub and includes one or more interior flanges extending radially outward from said cylindrical hub, and wherein each of said coils is disposed between two adjacent flanges.

9. An apparatus as recited in claim 1 wherein said bearing surface extends radially inward past said gear teeth to provide clearance between said gear teeth and objects disposed within the center region of said bobbin.

10. An apparatus for winding a strip of material into a coil within an arcuate elongated passage, said apparatus comprising:

first and second bobbin halves joined together to form a bobbin, said bobbin having a cylindrical hub with an outer surface adapted for receiving the strip of material and an inner surface with two sets of gear teeth disposed circumferentially thereon, said gear teeth being adapted for engaging drive means for rotating said bobbin to wind the strip of material into a coil on said bobbin, the edges of the gear portions of said bobbin halves being circumferentially offset so that the drive means engages one set of gear teeth of one of said bobbin halves and the other set of gear teeth of the other of said bobbin halves during the transition from engaging the gear teeth of one bobbin half to engaging the gear teeth of the other bobbin half; and joining means for joining said bobbin halves together within the arcuate elongated passage including means for axially and radially positioning said bobbin halves and means for securing said bobbin halves together to form said cylindrical bobbin.

11. An apparatus for winding a strip of magnetic material into a coil to form a magnetic core of a transformer within an arcuate elongated passage through prewound electrical windings of the transformer, said apparatus comprising:

first and second bobbin halves joined together to form a bobbin, said bobbin having cylindrical hub halves having inner and outer surfaces, the outer surfaces adapted to receive the strip of material, the inner surfaces having two sets of gear teeth disposed circumferentially about said inner surface and a bearing surface separating the sets of gear teeth, said gear teeth adapted for engaging drive means for rotating said bobbin to wind the strip of material into a coil on said first surface of said bobbin;

the sets of gear teeth of said hub halves being circumferentially offset so that said drive means engages one set of gear teeth of one of said bobbin halves and the other set of gear teeth of the other of said bobbin halves during the transition from engaging the gear teeth of one bobbin half to engaging the gear teeth of the other bobbin half; and joining means adapted for joining said bobbin halves together within the arcuate elongated passage prior to the winding of said strip of material into a coil on said first surface of said bobbin.

12. An apparatus for winding a strip of magnetic material into a coil to form a magnetic core of a transformer within an arcuate elongated passage through prewound electrical windings of the transformer, said apparatus comprising:

first and second bobbin halves joined together to form a bobbin, said bobbin having cylindrical hub halves having inner and outer surfaces, the outer surfaces adapted to receive the strip of material, the inner surfaces having two sets of gear teeth disposed circumferentially about said inner surface, said gear teeth adapted for engaging drive means for rotating said bobbin to wind the strip of material into a coil on said first surface of said bobbin;

the sets of gear teeth of said hub halves being circumferentially offset so that said drive means engages one set of gear teeth of one of said bobbin halves and the other set of gear teeth of the other of said bobbin halves during the transition from engaging the gear teeth of one bobbin half to engaging the gear teeth of the other bobbin half; and joining means adapted for joining said bobbin halves together within the arcuate elongated passage prior to the winding of said strip of material into a coil on said first surface of said bobbin.

13. An apparatus for winding a strip of magnetic material into a coil to form a magnetic core of a transformer within an arcuate elongated passage through prewound electrical windings of the transformer, said apparatus comprising:

first and second bobbin halves joined together to form a bobbin, said bobbin having a first, outer surface for receiving the strip of material and a second, inner surface having gear teeth adapted for engaging gear driven means for rotating said bobbin to wind the strip of material into a coil on said first surface of said bobbin;

said bobbin including a cylindrical hub having two sets of said gear teeth disposed circumferentially about said second, inner surface and spaced apart by a bearing surface; and joining means adapted for joining said bobbin halves together within the arcuate elongated passage prior to the winding of said strip of material into a coil on said first surface of said bobbin.

* * * * *